United States Patent
Stephens

(10) Patent No.: US 8,983,442 B2
(45) Date of Patent: Mar. 17, 2015

(54) TECHNIQUES AND APPARATUS TO MANAGE POWER IN WIRELESS DEVICE

(71) Applicant: Intel Corporation, Santa Clara, CA (US)

(72) Inventor: Adrian P. Stephens, Cottenham (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/715,825

(22) Filed: Dec. 14, 2012

(65) Prior Publication Data

US 2014/0171053 A1    Jun. 19, 2014

(51) Int. Cl.
*H04M 3/00*     (2006.01)
*H04W 52/02*    (2009.01)

(52) U.S. Cl.
CPC .................................. *H04W 52/0251* (2013.01)
USPC ......................................................... 455/418

(58) Field of Classification Search
USPC ........ 455/434, 515, 67.11, 426.1, 456.3, 436, 455/522, 12.1, 418; 340/933, 962, 437; 324/629, 244; 709/224; 702/141; 701/34.4
See application file for complete search history.

(56) References Cited

U.S. PATENT DOCUMENTS

| | | | |
|---|---|---|---|
| 2002/0147024 A1* | 10/2002 | Wan ............................... | 455/515 |
| 2011/0153805 A1* | 6/2011 | Beninghaus et al. ......... | 709/224 |
| 2011/0298613 A1 | 12/2011 | Ben Ayed | |
| 2011/0299422 A1* | 12/2011 | Kim et al. ..................... | 370/253 |
| 2012/0115464 A1 | 5/2012 | Jang | |
| 2012/0163206 A1 | 6/2012 | Leung et al. | |

OTHER PUBLICATIONS

International Search Report and Written Opinion received for PCT Patent Application No. PCT/US2013/048378, mailed Sep. 27, 2013, 9 pages.

* cited by examiner

*Primary Examiner* — Kiet Doan
(74) *Attorney, Agent, or Firm* — Kacvinsky Daisak Bluni PLLC

(57) ABSTRACT

An apparatus may include a sensor, a processor circuit, and an adaptive scanning component for execution on the processor circuit to receive sensor data from the sensor, to determine activity state based upon the received sensor data, and to adjust a wireless network scanning procedure in accordance with the received sensor data. Other embodiments are described and claimed.

22 Claims, 10 Drawing Sheets

1200

TECHNIQUES AND APPARATUS TO MANAGE POWER IN WIRELESS DEVICE

BACKGROUND

Present day wireless devices commonly afford the ability to communicate with other devices when situated in different locations. Many wireless technologies support communications by scanning for available communications links such as wireless networks. Scanning may take place automatically and periodically in order to ensure that a wireless device can establish or maintain a wireless communications link as needed. Such automatic scanning for networks may consume substantial power and may lead to reduced time between charging of a wireless device if the wireless device is unconnected to an external power source.

In order to address this issue, in present day devices the frequency for scanning for networks may be set to compromise between the need to maintain communications links and the need to reduce power consumption and extend battery life of the wireless device. However, such compromise may still result in excessive power use for periods when a wireless device is relatively stationary such that wireless device remains within a wireless communications range of given network. In such cases, the need to scan for wireless networks is reduced since communications with the current network are likely to be maintained. Moreover, the rate of scanning for new networks may be too low in situations in which the wireless device is transported in a rapid manner such that available access points in a wireless network environment surrounding the wireless device may rapidly change.

Accordingly, there may be a need for improved techniques to solve these and other problems.

DETAILED DESCRIPTION

Figure 1:
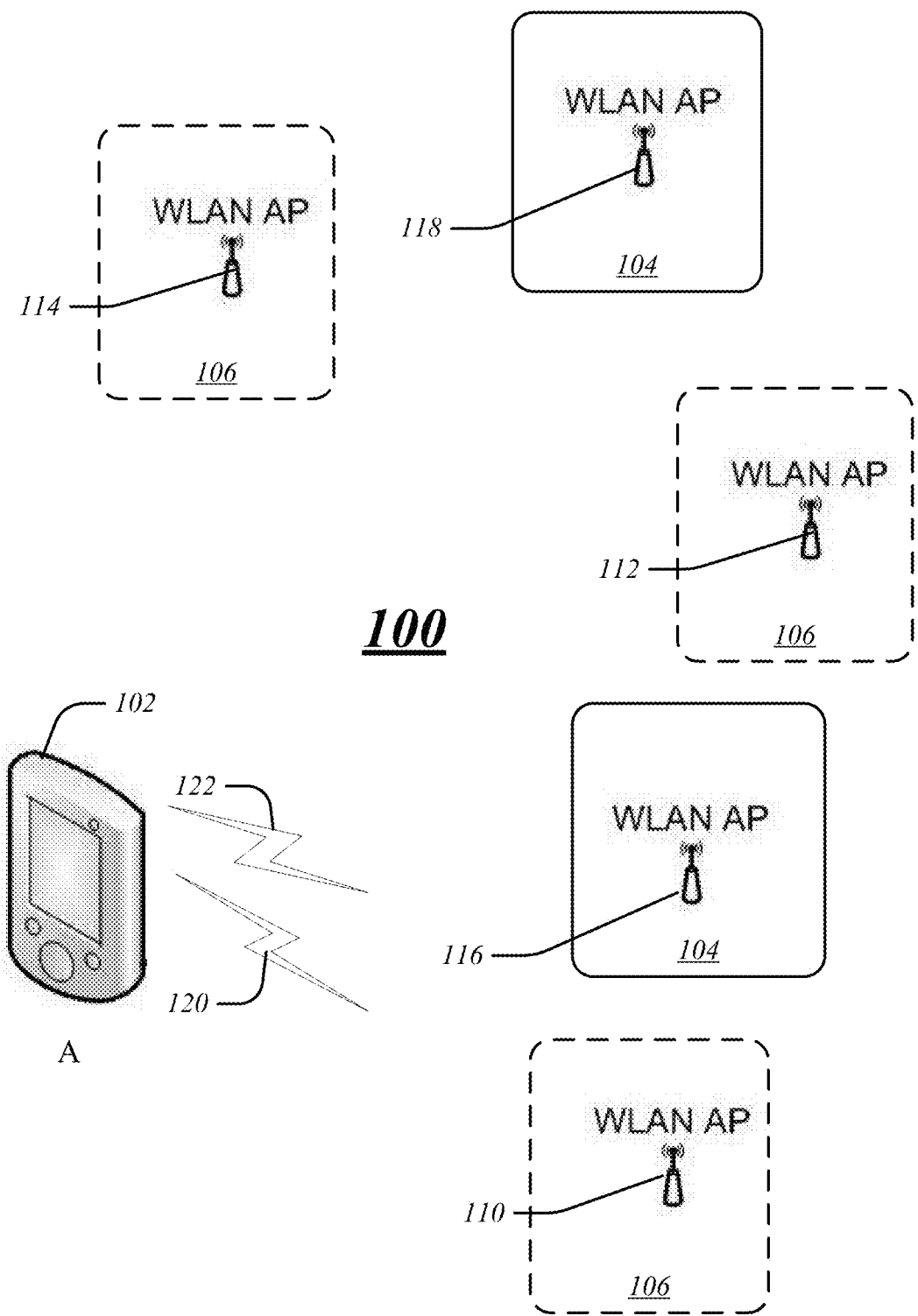
FIG. 1 illustrates an exemplary wireless communications environment.

The embodiments described herein present an apparatus and techniques to manage operation of a wireless device. In particular, various embodiments manage network scanning performed by a wireless device, which may result in more efficient power use while maintaining communications with networks.

Various embodiments facilitate the ability of a wireless device to adjust scanning for wireless networks or other wireless devices in accordance with information generated by the wireless device itself. In a particular embodiment, a wireless device performs adaptive scanning for wireless networks in which sensor input derived from one or more sensors located in the wireless device is employed to determine operation of the wireless device when scanning for wireless networks (termed "network scanning" hereinafter). For example, the rate of network scanning of a wireless device may be dynamically adjusted up or down in response to sensor data collected in real time by that wireless device. The term "wireless network," as used herein may refer to a wireless local area network (WLAN) such as a WiFi network, or a peer-to-peer (P2P) network that may be established in an ad-hoc manner a wireless, or a wireless wide area network (WWAN). Some embodiments of a communications system may be implemented with a radio technology such as IEEE 802.11 (WiFi), Bluetooth®, WiFi Direct™, and other radio technologies.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a communications arrangement 100. The communications arrangement 100 includes a WLAN 104 and WLAN 106. Within each of WLAN 104 and WLAN 106 multiple wireless communications points are deployed such as access points (AP) shown in FIG. 1. Also illustrated is a wireless device 102, which may be a mobile device such as a laptop computer, tablet computing device, smart phone or other electronic computing device or communications device, a television (TV), or videogame device. The embodiments are not limited in this context.

As the wireless device 102 moves between locations, wireless communications may be established and/or broken between the wireless device 102 and one or more communications points within the WLAN 104 and WLAN 106. In conventional operation, the wireless device 102 may be set to scan for available networks to establish a communications link. This scanning may take place according to a predetermined procedure, whether the wireless device 102 is stationary or moving between locations. Under conventional operation, the wireless device 102 may establish communications with the WLAN 106 via a wireless communications link 120 with WLAN access point 110. In addition or alternatively, the wireless device 102 may establish a communications link with the WLAN 104 via wireless communications link 122 with WLAN access point 116. In one scenario, the wireless communications device 102 may remain for an extended period of time at the position A in which the wireless communication links 120 and/or 122 are maintained, while the WLAN access points 112, 114, and 118 remain out of communications range. However, even though communications links 120, 122 may remain intact, and other access points 112, 114, 118 may continue to remain inaccessible, in conventional operation the wireless device 102 may repeatedly perform network scanning to scan for other WLANs. Accordingly, in conventional operation network scanning may be needlessly performed by the wireless device 102 in some circumstances.

In order to address this situation, and consistent with the present embodiments, the wireless device 102 may include an adaptive scanning component whose operation is detailed with respect to the figures to follow. Such an adaptive scanning component facilitates modifying the scanning for wireless networks and/or wireless devices that is performed by the wireless device 102. This adaptive scanning may be based on various sensor input (sensor data) received from sensors in the wireless device 102. The sensor input may be employed by the adaptive scanning component to aid in performing such tasks as analyzing the current environment of the wireless device 102, determining current activity associated with the wireless device 102, estimating availability of wireless networks, and predicting changes in availability of wireless networks.

Figure 2:
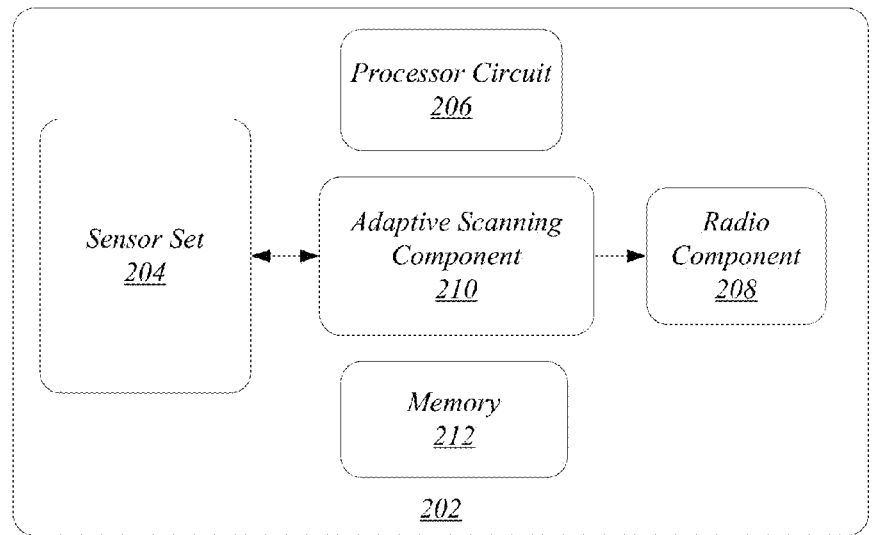
FIG. 2 illustrates one embodiment of a wireless apparatus.

FIG. 2 depicts a wireless device 202 consistent with the present embodiments. The wireless device 202 includes a sensor set 204, processor circuit 206, and radio component 208. The wireless device 202 also includes an adaptive scanning component 210 and memory 212. The adaptive scanning component 210 may direct scanning for wireless networks to be performed by the radio component 208.

The adaptive scanning component 210 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

As further illustrated in FIG. 2, the adaptive scanning component 210 is coupled to the sensor set 204 to receive sensor data collected by one or more sensors in the sensor set 204. The sensor set 204 may provide sensor data automatically to the adaptive scanning component 210 in some embodiments. In further embodiments, the adaptive scanning component 210 may interrogate the sensor set 204 to obtain sensor data. Based upon information contained in the sensor data received from sensor set 204, the adaptive scanning component 210 may adjust network scanning. In some examples, discussed in detail below, the adaptive scanning component 210 may adjust scanning frequency for wireless networks downwardly from a present level based upon received sensor data. In other examples, the received sensor data may trigger the adaptive scanning component 210 to increase scanning frequency for wireless networks.

More generally, the use of information collected from sensor set 204 facilitates the ability to more effectively schedule network scanning by the adaptive scanning component 210. For example, when sensor data generated by the sensor set 204 provides information from which the adaptive scanner component 210 determines that the wireless device 202 may remain connected to a current wireless network for an extended period of time, the adaptive scanning component 210 may adjust network scanning rate downwardly. On the other hand, if sensor data received from the sensor set 204 indicates that a current connection to a wireless network may be compromised in a coming period, or that other wireless networks may be brought within communications range of the wireless device 202, the adaptive scanning component 210 may upwardly adjust network scanning rate.

Figure 3:
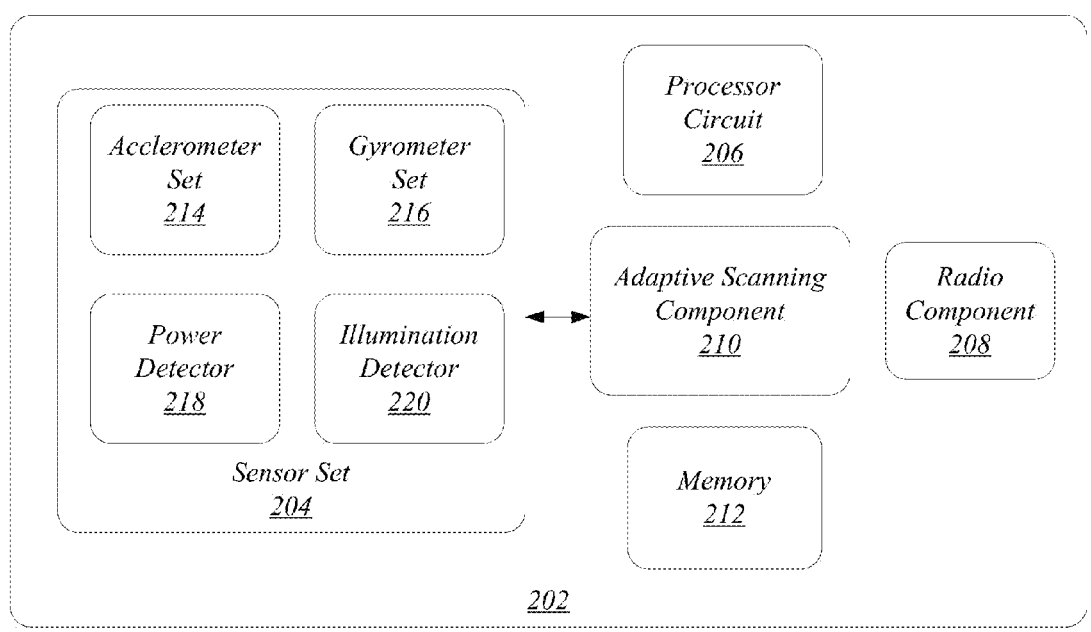
FIG. 3 illustrates details of an embodiment of a wireless apparatus.

FIG. 3 shows an embodiment of the wireless device 202 depicting details of one variant of the sensor set 204. In this variant the sensor set 204 includes an accelerometer set 214, gyrometer set 216, power detector 218 and illumination detector 220, each of which may be referred to herein as a "sensor of the sensor set 204." The accelerometer set 214 may be used to detect acceleration of the wireless device 202 in one or more different directions. The gyroscope set 216 may be used to detect rotation of the wireless device 202 with respect to one or more rotational axes. The power detector 218 may be used to indicate when the wireless device is coupled to an external power source, that is, when a battery of the wireless device is not discharging. The illumination detector 220 may be used to detect levels of visible light.

Information derived by one or more sensor of sensor set 204 may be sent to the adaptive scanning component 210. In some cases sensor data may be collected and forwarded as detected to the adaptive scanning component 210, while in other cases, the data may be sent according to a predetermined procedure to the adaptive scanning component 210. In addition to collecting sensor data from the sensor set 204, the adaptive scanning component 210 may retrieve information from the memory 212. Although depicted as a separate component, in some examples, the memory 212 may be included in the adaptive scanning component 210.

In various embodiments, the memory 212 may include information that allows the adaptive scanning component 210 to interpret sensor data received from the sensor set 204. The memory 212 may contain, for example, information that correlates sensor data with activity of a user of the wireless device 202. In turn, when given user activity or activity state is identified by the adaptive scanning component 210, the adaptive scanning component may adjust network scanning so that the network scanning is appropriate for the user activity. In this manner, parameters such as parameters for power saving can be adjusted based on the identified or estimated user activity.

Figure 4:
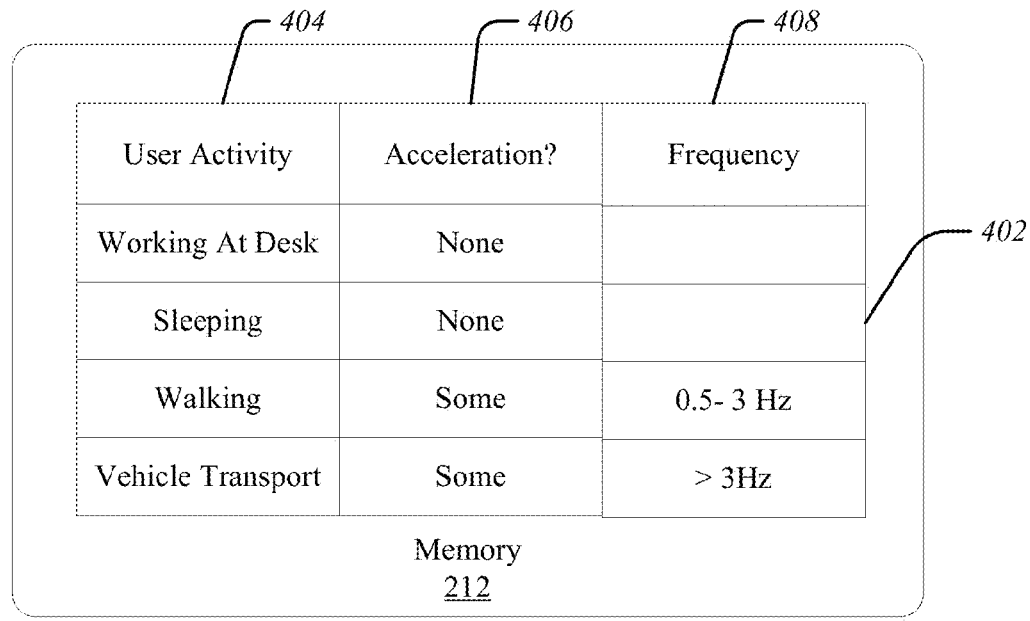
FIG. 4 illustrates an exemplary data structure.

FIG. 4 illustrates one example of a data structure, referred to herein as an "activity" profile 402 that may be stored in the memory 212. The activity profile 402 includes user activities list 404, a sensor activity list 406, in this case, acceleration, and a value list 408 associated with the sensor measurement, in this case acceleration frequency. The activity profile 402 may be used by the adaptive scanning component 210 to determine user activity based upon received sensor data. In the activity profile 402 the sensor activity list 406 provides an indication as to whether an accelerometer in a wireless device is likely to be actively generating sensor data associated with a given user activity. For example, "working at desk" or "sleeping" are activities that may not likely produce any acceleration events, since a user may not be actively handling the wireless device at during such activities; nor is the device likely to otherwise undergo motion that may be detected by an accelerometer.

The value list 408 shows entries that indicate a frequency component associated with a sensor activity shown in the sensor activity list 406. In the example shown in FIG. 4, for purposes of illustration the activity profile 402 indicates that the user activity of "walking" is associated with a relatively lower frequency component of the accelerometer, while the user activity "vehicle transport" is associated with a relatively higher frequency component. The term "frequency component" as used herein refers to a repeating feature of detected accelerometer data. For example, a frequency component may be the location of the highest peak in a fast Fourier transform (FFT) of sensor acceleration recorded in the wireless device.

In one example, the frequency component may exhibit a frequency of 1-3 cycles per second (Hz) when a typical user is walking while carrying the wireless device in question. On the other hand, if the user is traveling with the wireless device in a vehicle such as a car, train, or bus, the frequency component may exhibit a frequency of several Hz or higher. An activity profile consistent with the present embodiments may accordingly list frequency thresholds associated with accelerometer sensor data to define the limits of different categories of user activity. For example, "walking" may defined by an upper frequency limit of 3 Hz. In some instances "walking" may also be defined by a lower frequency limit of 0.5 Hz, as also shown in FIG. 4. Moreover, the activity of "vehicle transport" may be associated with a frequency above 3 Hz for the frequency component as shown in FIG. 4. Thus, in the example of FIG. 4, the user activity "walking" exhibits both a lower threshold (0.5 Hz) and upper threshold (3 Hz), while the user activity "vehicle transport" exhibits a lower threshold (3 Hz). Of course, in other examples, "walking" need not be defined by a lower threshold to frequency of a frequency component of accelerometer data and "vehicle transport" may be defined by an upper frequency threshold.

In this manner, in one example, when sensor data is received from the accelerometer set 214, the adaptive scanning component 210 may determine a current activity state associated with user activity of the wireless device 202 according to the recorded frequency of a frequency component of the accelerometer data. The adaptive scanning component 210 may generate instructions to adjust scanning to be performed by the radio component 208 accordingly.

The term "activity state" as used herein refers to any combination of environment and actions that the wireless device 202 may experience. An activity state may represent a defined set of metrics that are derived from sensor measurements such as acceleration measurements and/or illuminations measurements that are recorded by the wireless device 202. Specific activity states may be referred to herein by the associated user activity. In one example the activity state "walking" associated the user activity "walking" may involve periodic acceleration of the wireless device similar to that experienced by a pedometer. When the wireless device 202 determines that a current activity state of the wireless device 202 is "walking," the wireless device take actions based upon assumptions concerning the changing communication environment associated with walking. For example, it may be assumed that the wireless device 202 may likely be transported into and/or out of different wireless communications networks when a user is walking. Thus, when the wireless device 202 recognizes a given activity state such as "walking" the wireless device 202 may perform certain operations based upon the current or anticipated changes in environment, such as changes in availability of wireless networks. In the discussion to follow, the term "user activity" and "activity state" may be used interchangeably.

Figure 5:
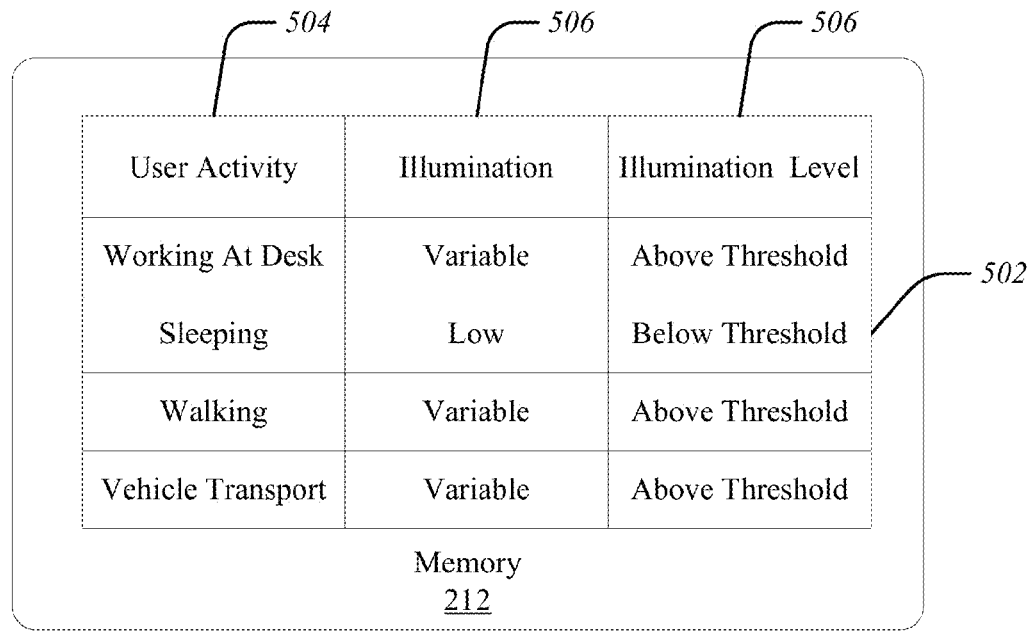
FIG. 5 illustrates another exemplary data structure.

FIG. 5 illustrates another example of an activity profile 502 that may be stored in the memory 212. The activity profile 502 includes user activities list 504, a sensor activity list 506, in this case, illumination, and a value list 508 associated with the sensor activity, in this case illumination threshold. The activity profile 502 may also be used by the adaptive scanning component 210 to determine user activity based upon received illumination sensor data. In the activity profile 502 the sensor activity list 506 provides a qualitative indication as to illumination levels that may be associated with a given user activity. For example, "working at desk" or "walking" or "vehicle transport" are user activities that may not be associated with a variable level of illumination. On the other hand "sleeping" is a user activity for which a low level of illumination may be expected for a wireless device that is kept near the user.

The value list 508 shows entries that indicate values of detected illumination that may be associated with an illumination sensor activity shown in the sensor activity list 506. In the example shown in FIG. 5, for purposes of simplicity only qualitative values are shown. Thus, the activity profile 502 indicates that the user activity of "sleeping" is associated with an illumination level below an illumination threshold, while the user activities of "walking" and "working at desk" as well as "vehicle transport" may be associated with an illumination level, however variable, that is higher than the threshold.

In this manner, in one example, when sensor data is received from the illumination detector 220, the adaptive scanning component 210 may determine a current user activity of the wireless device 202 according to whether the illumination level is below or above the illumination threshold in the value list 508.

In some embodiments, the adaptive scanning component 210 may employ sensor data received from multiple types of sensors to determine a current activity state. For example, in the illustration of FIG. 5, three different types of user activity are associated with illumination levels above the illumination threshold. Thus, sensor data that indicates the current illumination level proximate the wireless device 202 is above the illumination threshold may not in itself provide sufficient information for the adaptive scanning component to distinguish among the three different "high illumination level" activities shown in FIG. 5. However, if accelerometer data concurrently generated by the accelerometer set 214 indicates that there is no acceleration taking place, the adaptive scanning component 210 may determine that the current activity state is neither "walking" nor "vehicle transport." Moreover, since the only other activity associated with no acceleration is "sleeping" which is associated with illumination levels below the actual detected illumination, the adaptive scanning component 210 may determine that the combination of sensor data received from illumination sensor 220 and accelerometer set 214 uniquely specifies "working at desk" as the current user activity.

Consistent with the present embodiments, the adaptive scanning component 210 may adjust network scanning based upon a determination of current activity state of the wireless device 202 as well as the current network scanning procedure in effect. In one example, activities such as working at a desk or sleeping may be deemed to require slow network scanning. An assumption behind this determination is that because a user is not moving and/or is less likely to move in the near future, the environment of wireless networks proximate a user wireless device is unlikely to change. For example, turning once more to FIG. 1, if a wireless device is located at location A near a sleeping user, the wireless device 102 may be predicted to remain at the same relative distance from the WLAN AP 104 and WLAN AP 106 for a given period, such as the next 10 minutes. If the present network scanning rate is deemed to be excessive based upon a determination of activity state, network scanning can therefore be adjusted downwardly to effect aggressive power savings. For example, if the current network scanning rate corresponds to one scan every few seconds, the network scanning rate may be rapidly reduced to one scan every minute or one scan every three minutes in some instances.

In the case where activity state is deemed to be vehicle transport, such as in a car, train or bus, the network scanning may also be adjusted based upon assumptions as to the need to scan for new networks. For example, if it is assumed that establishing connections to new networks is not of paramount importance during the vehicle transport activity, aggressive power saving may also be instituted by reducing the network scan rate.

In the case where the current activity is determined to be "walking" on the other hand, the adaptive scanning component 210 may adjust upwardly the network scan rate. For example, when the adaptive scanning component 210 receives sensor data that indicates walking has commenced, the adaptive scanning component may start rapid scanning for networks. By doing so, the adaptive scanning component 210 may facilitate the ability to rapidly encounter a new wireless network and thereby avoid delays in finding a new network as the user changes location. For example, in one scenario the adaptive scanning component 216 may increase scan rate as a user exits a vehicle and begins walking toward a shopping mall. This may facilitate more rapid access of a WiFi network hosted by the shopping mall and may therefore be more likely to receive in a timely fashion information being pushed by an advertiser.

In the event that a user of the wireless device 202 were to continue walking for an extended time, the adaptive scanning component 210 may adjust the network scanning rate downwardly so that power may be conserved.

In various other embodiments, the adaptive scanning component 210 may adjust network scanning whenever a change in activity state is determined. For example, the adaptive scanning component 210 may be set to initiate rapid network scanning whenever an activity change is detected. In other embodiments, the adaptive scanning component 210 may instead be set to adjust frequency of scanning for networks either upwardly or downwardly when a change of activity is detected according to the nature of the sequence of activities.

In a further embodiment, when input from power detector 218 indicates that the wireless device 202 is coupled to an external power source, the adaptive scanning component 210 may set a lower limit for network scanning. Accordingly, even though the wireless device 202 is likely to be relatively stationary while coupled to an external power source, such as when the activity state is "working at desk," network scanning may be set at a higher rate than when the wireless device is not "plugged in" since battery power conservation may be of less concern.

In cases in which adaptive scanning is used to change network scanning frequency based upon wireless device sensor input, an adaptive scanning procedure may be characterized by multiple parameters. For example, a first parameter may describe the initial scan period, that is, the time between successive network scans during an initial state of the wireless device. A second parameter may describe the final scan period, which represents the time between network scans after the adaptive scanning procedure is complete. A third parameter may describe the duration for transitioning between the first scan rate associated with the first scan period and the final scan rate associated with the final scan period. The transition between the first scan rate and final scan rate may be further characterized by whether the scan rate changes linearly or logarithmically with time between first scan rate and final scan rate.

Consistent with some embodiments, thresholds associated with sensor data produced by a wireless device, such as accelerometer data or illumination data, may be determined in an adaptive manner based upon self-learning performed by the wireless device and/or based upon input received by a user. In some instances, an adaptive scanning component may take periodic observations of the environment of the wireless device via one or more sensors and may build clusters (in a multi-dimensional plot of activity versus multiple sensor inputs) related to one or more activities based upon a chosen set of metrics.

Figure 6:
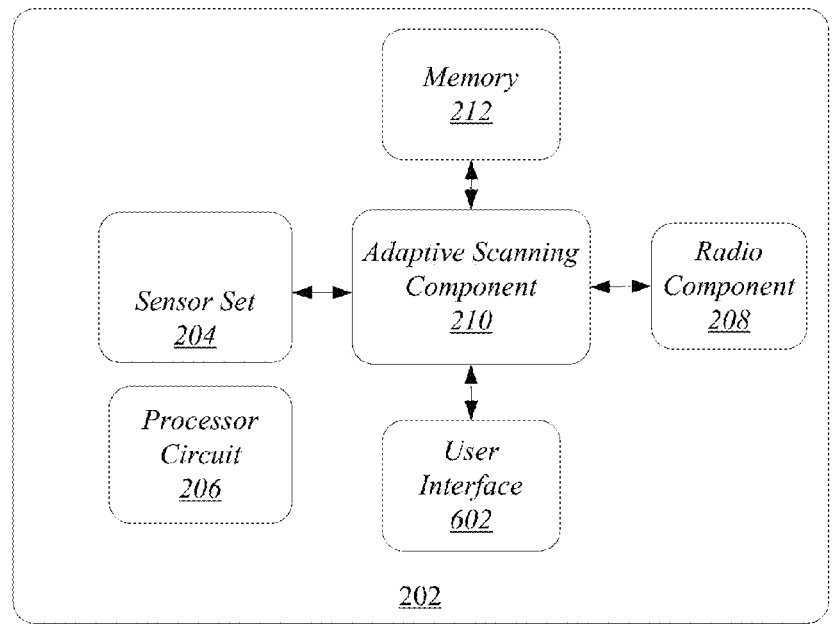
FIG. 6 illustrates another embodiment of a wireless apparatus.

FIG. 6 illustrates an embodiment of wireless device 202 in which the adaptive scanning component 210 is coupled to multiple sources of input from which adaptive scanning procedures may be built and/or modified. As discussed hereinabove the adaptive scanning component may receive sensor input on a periodic or ad-hoc basis that provides information about a current or past state of the wireless device 202. The adaptive scanning component may additionally receive user input through a user interface 602. In one example, a user may provide information as to current user activity through the user interface 602. This information may be correlated with concurrent sensor data and/or data radio data received via radio component 208. In this manner, the adaptive scanner may better match sensor measurement parameters to user activities and/or wireless network information that may be correlated to the sensor data and/or user activity. By collecting such information, which may be stored in memory 212, the adaptive scanning component 210 may better adjust features such as thresholds for parameters that determine a given activity state. The adaptive scanning component 210 may additionally employ the information to develop predictive capability, such as the ability to better predict the availability of a wireless network based on the receipt of a given set of sensor data.

In one example, a given pattern of sensor data, such as changes in accelerometer data, may be correlated with user movement between two different environments in which the availability of wireless networks varies. Accordingly, when the adaptive scanning component 210 receives such a sensor data pattern from the sensor set 204, the wireless device 202 may better manage network scanning. For example, a currently detected sensor data pattern may indicate that the wireless device 202 is entering an environment in which the expected availability of new wireless WiFi networks is low. Accordingly, the adaptive scanning component 210 may send signals to reduce network scanning rate and initiate a power savings mode.

Similarly, the adaptive scanning component 210 may examine a pattern of radio data received from wireless networks via radio component 208, and may compare the received radio data to radio information stored in memory 212 to identify a signature that may be used to predict availability of WiFi networks in one example. The adaptive scanning component 210 may also analyze a combination of received radio data and sensor data received from sensor set 204 to predict wireless network availability. For example, during a given period sensor data in a wireless device that is indicative of one or more type of activity state may be collected and stored together with radio data received during the same period, which may indicate the presence of wireless network(s). This information may be used to predict wireless network capability for the wireless device at a subsequent period based upon based upon sensor data received in the subsequent period.

Figure 7:
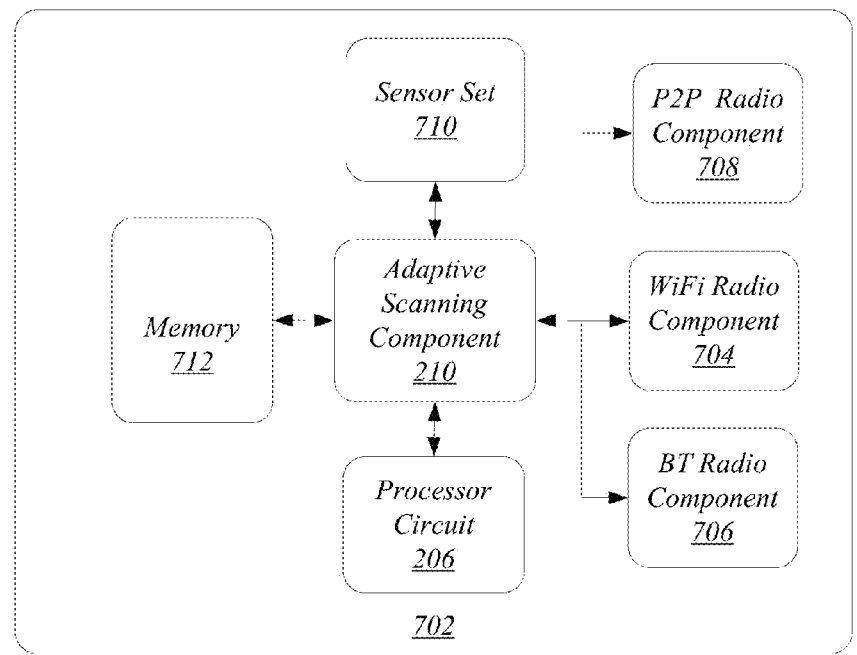
FIG. 7 illustrates a further embodiment of a wireless apparatus.

As noted previously, in various embodiments an adaptive scanning component may interact with more than one radio component to manage communications with more than one type or wireless network. FIG. 7 depicts a wireless device 702 that includes multiple radio components including WiFi radio component 704, Bluetooth radio component 706 and peer-to-peer (P2P) radio component 708. Each radio component may include a combination of known software and hardware components for communication with a respective WiFi, Bluetooth, or P2P network and/or wireless device. In operation, scanning for an appropriate wireless network or wireless devices may be performed via one or more of the radio components 704-708. In various embodiments, the adaptive scanning component 210 may adjust scanning for wireless networks/wireless devices in one or more of the radio components 704-708 based upon sensor input received from the sensor set 710 and information from memory 712. In one example, during an initial period the adaptive scanning component 210 may determine according to procedures discussed above that a user (and current possessor) of wireless device 702 is walking, resulting in network scanning being performed at a relatively higher rate by the WiFi radio component 704. Network or device scanning may also be performed at the same time by the Bluetooth radio component 706, and P2P radio component 708. It is to be noted that in some embodiments hardware portions of two or more of the components radio 704, 706, 708 may, but need not, be located on the same semiconductor die (chip). In one example, the P2P radio component 708 may employ known WiFi™ technology in which WiFi enabled devices are enabled to couple directly to one another. The WiFi Direct™ technology for example, employs the IEEE 802.11 standard in which a software implementation of an access point is embedded in each mobile wireless device to couple to its peer mobile devices.

While a user of the wireless device 702 continues walking, each of the radio components 704, 706, 708 may continue network/device scanning at a first set of scanning rates. Subsequently, the wireless device 702 may determine in accordance with procedures discussed above that the present user activity is "working at desk." The adaptive scanning component 210 may accordingly issue instructions for at least one of the radio components 704, 706, 708 to reduce scanning rate based on the likelihood that in a forthcoming period the need to connect to a different wireless network or different access point may be lessened.

It is to be noted that in the above scenario, the adjustment to scanning for wireless networks/devices in response to a determined activity state may vary among the radio devices 704, 706, 708. For example, the network scanning rate for the WiFi radio component 704 may be aggressively adjusted downwardly because scanning for new WiFi access points is likely to be unnecessary while the wireless device 702 remains stationary. On the other hand, while seated at a desk, a user may wish to maintain running of an application to scan for and identify other BT devices that may come into proximity of the wireless device 702. For example, the user of the wireless device 702 may wish to be rapidly apprised when another recognized Bluetooth device comes into proximity, such as a wireless device of a friend or family member. In known applications, a user may be apprised by a popup or other message displayed on the wireless device 702 that such a recognized Bluetooth device has been recently detected to be in proximity. Accordingly, the adaptive scanning component 210 may be set to allow scanning rate for BT devices via Bluetooth radio component 706 to remain at a same level even when the user activity is determined to be "working at desk." This is because, although the wireless device 702 has been determined to be stationary, it is foreseeable with some likelihood that other BT wireless devices may come into proximity with the wireless device 702 in a forthcoming period. On the other hand, when the adaptive scanning component 210 detects sensor data from the sensor set 710 that indicates the user is asleep, the scanning rate for other BT devices conducted via the BT radio component may be rapidly reduced, since the user may not wish to be disturbed with such information while asleep.

In various embodiments, when a change of activity state is determined, scanning for wireless networks may be adjusted in accordance with parameter(s) associated with change in the activity state. In one example, a set of parameters P1, P2, ... $P_N$ may be associated with a change in activity state. Sensors in the wireless device may be monitored and metrics from the sensor data collected may be clustered to determine when a change of activity state takes place. When a change in activity state is determined as generally described hereinabove by the adaptive scanning component 210, a data structure associated with the activity state change, which may be located in memory 212, may be queried to determine the set of the parameters P1, P2, ... $P_N$ to be applied to perform an adaptive scanning procedure. For example, a parameter P1 may be an initial scan interval (an inverse of scan rate) for scanning for wireless networks, while a parameter P2 may be a final scan interval for scanning for wireless networks after the scanning rate is adjusted based upon a change in activity state. A further parameter P3 may define an interval for the scan rate for wireless networks to be changed from an initial scan interval to double the initial scan interval as the scan rate is changed between that represented by P1 and that represented by P2. In one instance P1, representing an initial relatively rapid scan rate, may be 5 seconds, while P2 may be 300 seconds. The parameter, P3 may be 20 seconds, representing the time in which the scan interval increases from 5 seconds to 10 seconds. This example is merely exemplary and any desired set of parameters may be selected to optimize and adaptive scanning procedure. In further examples, the adjustment in scan rate from an initial to final scan rate may proceed either in a linear fashion or logarithmic fashion as a function of time.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
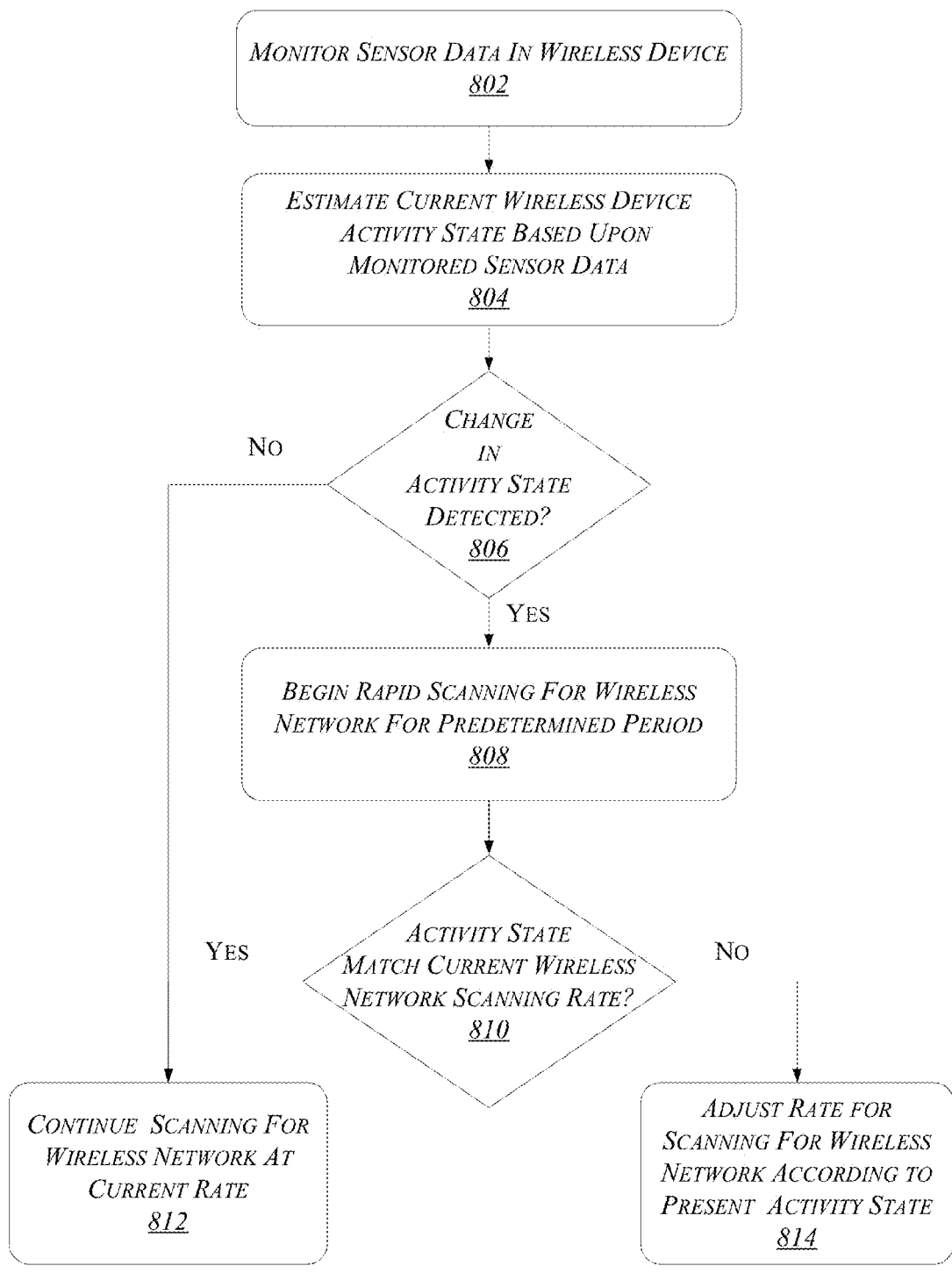
FIG. 8 illustrates an exemplary first logic flow.

FIG. 8 depicts an exemplary first logic flow 800. At block 802 sensor data is monitored in a wireless device. In some examples, the monitored sensor data may include data from accelerometers, gyrometers, illumination detectors, and other sensors. At block 804, the current activity state of the wireless device user is estimated based upon the monitored sensor data.

At decision block 806 a determination is made as to whether a change in activity state for the wireless device user has been detected based upon the monitored sensor data. In some examples, instances of changes in accelerometer data, such as when values of frequency component(s) of the accelerometer cross a threshold, may be used to determine that a change in activity state has occurred.

If a change is determined to have occurred, the flow moves to block 808. At block 808, rapid scanning for wireless networks is commenced for a predetermined period.

The flow then moves to block 810 where a determination is made as to whether activity state matches the current scanning rate for wireless networks. If so, the flow moves to block 812 in which the current scanning rate for wireless networks is maintained. If not, the flow moves to block 814. At the block 814, the rate for scanning for wireless networks in adjusted according to the current activity state. In some examples, the scanning rate may be adjusted downwardly, while in other examples, the scanning rate may be adjusted upwardly.

At block 806, if no change in activity state is detected, the flow proceeds to block 812.

Figure 9:
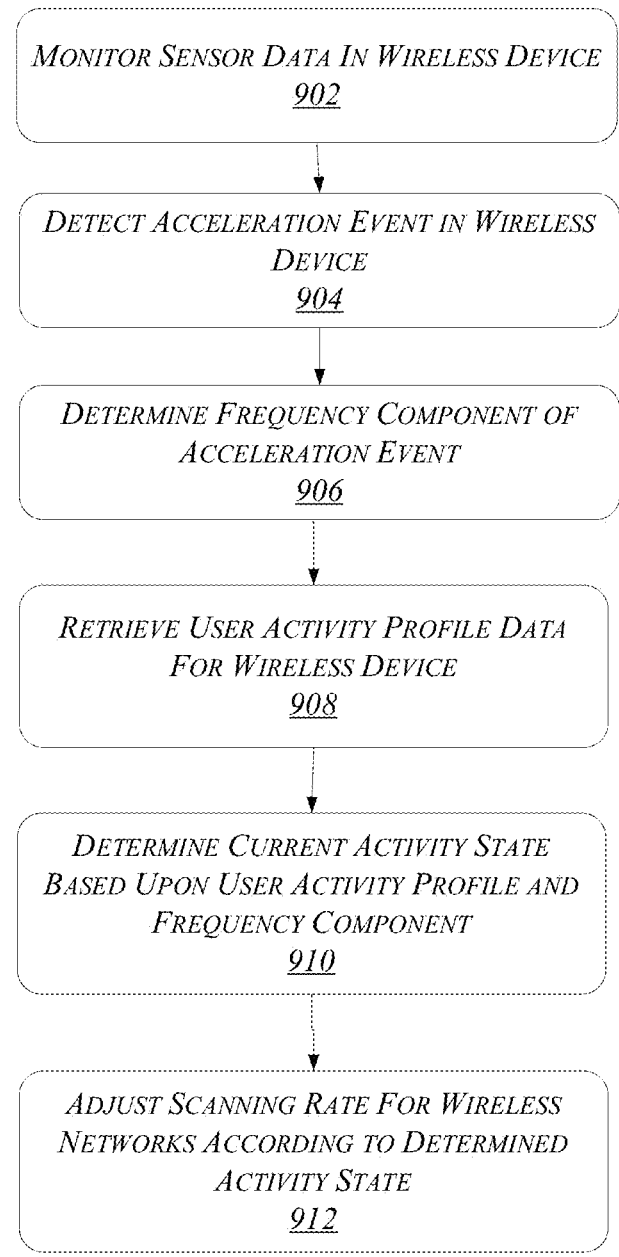
FIG. 9 illustrates an exemplary second logic flow.

FIG. 9 depicts an exemplary second logic flow 900. At block 902, sensor data is monitored in a wireless device. At block 904, an acceleration event is detected in the wireless device. At block 906, a frequency component of the acceleration event is determined. At block 908, a user activity profile is retrieved for the wireless device. At block 910 a current activity state is determined based upon the user activity profile and determined frequency component of the acceleration data. At block 912, the scanning rate for wireless networks is adjusted based upon the determined activity state.

Figure 10:
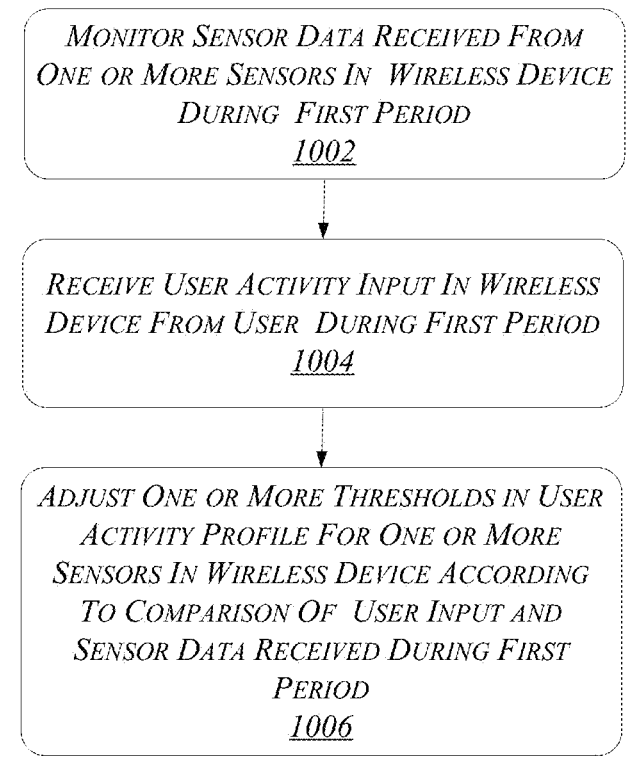
FIG. 10 illustrates an exemplary third logic flow.

FIG. 10 depicts an exemplary third logic flow 1000. At block 1002, sensor data received from one or more sensors in a wireless device is monitored during a first period. At block 1004 user activity input is received in the wireless device from a user during the first period. In some instances, the user input may be received via a user interface on the wireless device. At block 1006, one or more thresholds in a user activity profile are adjusted for one or more sensors in the wireless device according to a comparison of user input and sensor data received during the first period.

Figure 11:
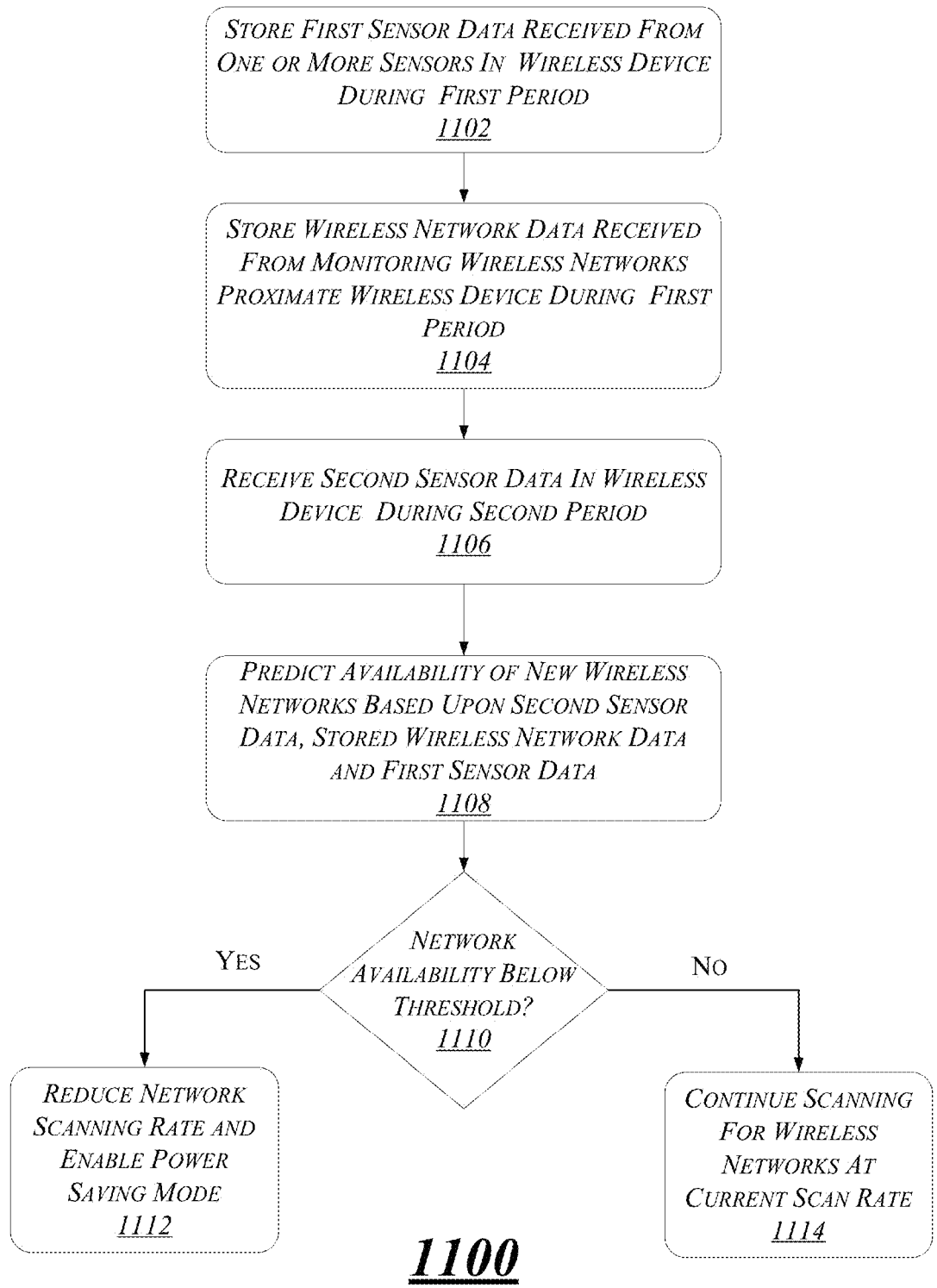
FIG. 11 illustrates an exemplary fourth logic flow.

FIG. 11 presents an exemplary fourth logic flow. At block 1102, sensor data received from one or more sensors in a wireless device during a first period is stored. At block 1104 wireless network data received from monitoring wireless networks proximate the wireless device in the first period is also stored. At block 1106 sensor data is received in the wireless device during a second period. At block 1108 the availability of new wireless networks is predicted based upon the sensor data received during the second period. At block 1110 a decision is made as to whether the predicted wireless network availability is below a threshold. If so, the flow proceeds to block 1112. At the block 1112, the scanning rate for wireless networks in reduced and a power savings mode for the wireless device initiated. If, at block 1110 the network availability exceeds the threshold, the flow moves to block 1114, where scanning is continued for wireless networks at a current scanning rate.

Figure 12:
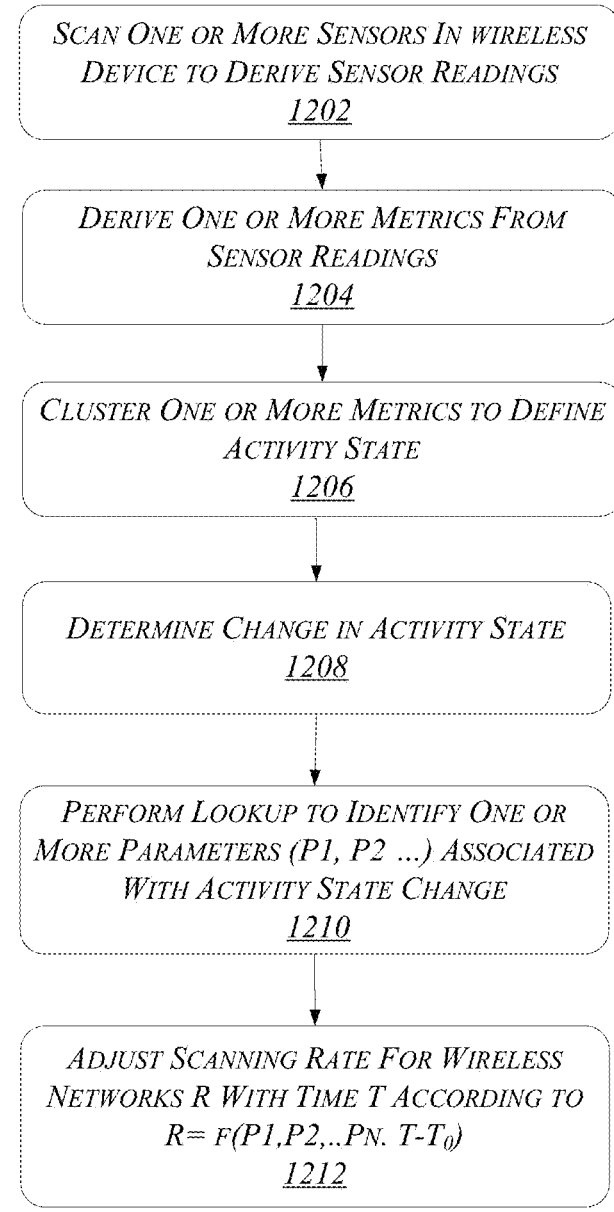
FIG. 12 illustrates an exemplary fifth logic flow.

FIG. 12 illustrates an exemplary fifth logic flow. At block 1202, one or more sensors of a wireless device are scanned to derive sensor readings. For example, one or more accelerometers, gyrometers, and an illumination detector may be monitored to derive sensor readings. At block 1204, one or more metrics are derived from the sensor readings. One example of a metric is a frequency component derived from accelerometer readings.

At block 1206, the one or more metrics are clustered to define an activity state. For example, a determined accelerometer frequency and illumination reading may be clustered to define an activity state.

At block 1208, a change in activity state is determined. The change in activity state may be determined when the operations defined at the blocks 1202-1204 are performed periodically, occasionally or continually over time.

At block 1210, a lookup is performed to identify one or more parameters (P1, P2 . . . ) associated with the change in activity state. In some examples, a parameter P1 may be an initial scan interval for scanning for wireless networks, while a parameter P2 may be a final scan interval for scanning for wireless networks after the scanning rate is adjusted based upon a change in activity state.

At block 1212, the scanning rate R for scanning for wireless networks in adjusted with time T, where $R=f(P1, P2, \ldots P_N, T-T_0)$ where $T_0$ represents the time since the last change in activity state.

Figure 13:
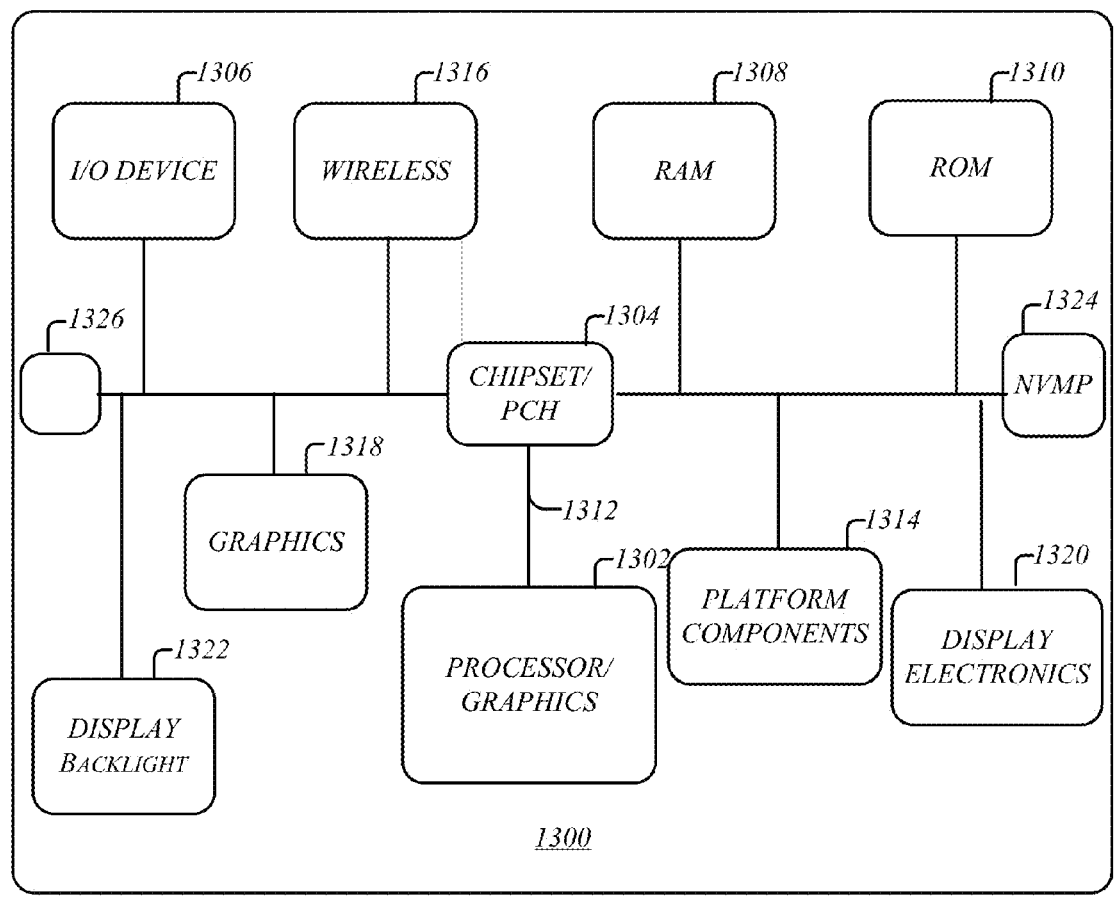
FIG. 13 illustrates one embodiment of a computing architecture.

FIG. 13 is a diagram of an exemplary system embodiment and in particular, FIG. 13 is a diagram showing a platform 1300, which may include various elements. For instance, FIG. 13 shows that platform (system) 1300 may include a processor/graphics core 1302, a chipset/platform control hub (PCH) 1304, an input/output (I/O) device 1306, a random access memory (RAM) (such as dynamic RAM (DRAM)) 1308, and a read only memory (ROM) 1310, display electronics 1320, display backlight 1322, and various other platform components 1314 (e.g., a fan, a crossflow blower, a heat sink, DTM system, cooling system, housing, vents, and so forth). System 1300 may also include wireless communications chip 1316 and graphics device 1318. The embodiments, however, are not limited to these elements.

As shown in FIG. 13, I/O device 1306, RAM 1308, and ROM 1310 are coupled to processor 1302 by way of chipset 1304. Chipset 1304 may be coupled to processor 1302 by a bus 1312. Accordingly, bus 1312 may include multiple lines.

Processor 1302 may be a central processing unit comprising one or more processor cores and may include any number of processors having any number of processor cores. The processor 1302 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1302 may be multiple separate processors located on separate integrated circuit chips. In some embodiments processor 1302 may be a processor having integrated graphics, while in other embodiments processor 1302 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, an apparatus may include a sensor, processor circuit, and an adaptive scanning component for execution on the processor circuit to receive sensor data from the sensor, determine an activity state based upon the received sensor data, and adjust a wireless network scanning procedure in accordance with the received sensor data.

In another embodiment, the sensor data may comprise accelerometer data, gyrometer data, or illumination sensor data.

Alternatively, or in addition, in a further embodiment, the adaptive scanning component may be for execution on the processor circuit to determine frequency of a frequency component of the accelerometer data, to compare the determined frequency component to a frequency threshold for acceleration events, and to adjust scanning rate for wireless networks performed by the apparatus between a first instance and second instance when the frequency of the frequency component crosses the frequency threshold between the first instance and second instance.

Alternatively, or in addition, in a further embodiment the frequency threshold comprises a frequency of about 2 to 5 Hz.

Alternatively, or in addition, in a further embodiment the adaptive scanning component may be for execution on the processor circuit to estimate current activity state associated with the apparatus based upon the received sensor data, and to initiate rapid scanning for wireless networks when a change in activity state is determined.

Alternatively, or in addition, in a further embodiment, the adaptive scanning component may be for execution on the processor circuit to receive sensor data received during a first period, to receive user input indicating activity state during the first period; and to adjust one or more thresholds indicative of activity state based upon a comparison of the user input and sensor data received in the first period.

Alternatively, or in addition, in a further embodiment, the adaptive scanning component may be for execution on the processor circuit to store wireless network data and first sensor data received during a first period, to receive second sensor data received during a second period, to predict availability of new wireless networks based upon the wireless network data, first sensor data, and second sensor data, and to reduce a network scanning rate when the predicted availability is below an availability threshold value.

Alternatively, or in addition, in a further embodiment, the adaptive scanning component may be for execution on the processor circuit to direct scanning for an 802.11 wireless network, a Bluetooth device, or a device enabled for peer to peer communications.

Alternatively, or in addition, in a further embodiment the apparatus of claim 1, the adaptive scanning component for execution on the processor circuit to determine a change in activity state based upon the sensor data, to identify a set of parameters (P1, P2, ... $P_N$) associated with the change in activity state, and to adjust scanning rate R for wireless networks as a function $f$ of time T, according to $R=f(P1, P2, \ldots P_N, T-T_0)$, where $T_0$ represents the time since a last change in activity state.

Alternatively, or in addition, in a further embodiment, the sensor may comprise a sensor set that includes one or more of a set of accelerometers to generate accelerometer data associated with the apparatus, a set of gyrometers to generate orientation data associated with the apparatus, or an illumination sensor to detect illumination levels proximate the apparatus.

In another embodiment, a computer implemented method may include receiving sensor data from one or more sensors coupled to an apparatus, determining activity state for the apparatus based upon the received sensor data, and adjusting a wireless network scanning procedure in accordance with the received sensor data.

In a further embodiment of the computer implemented method the sensor data may comprise one or more of: accelerometer data, gyrometer data, and illumination sensor data.

Alternatively, or in addition, in a further embodiment, the computer implemented method may comprise determining frequency of a frequency component of the accelerometer data, comparing the determined frequency component to a frequency threshold for acceleration events, and adjusting scanning rate for wireless networks performed by the apparatus between a first instance and second instance when the frequency of the frequency component crosses the frequency threshold between the first instance and second instance.

Alternatively, or in addition, in a further embodiment of the method, the frequency threshold may comprise a frequency of about 2 to 5 Hz.

Alternatively, or in addition, in a further embodiment, the computer implemented method may comprise estimating current activity state associated with the apparatus based upon the received sensor data, and initiating rapid scanning for wireless networks when a change in activity state is determined.

Alternatively, or in addition, in a further embodiment, the computer implemented method may include receiving sensor data received during a first period, receiving user input indicating activity state during the first period, and adjusting one or more thresholds indicative of activity state based upon a comparison of the user input and sensor data received in the first period.

Alternatively, or in addition, in a further embodiment, the computer implemented method may comprise storing wireless network data and first sensor data received during a first period, receiving second sensor data received during a second period, predicting availability of new wireless networks based upon the wireless network data, first sensor data, and second sensor data, and reducing a network scanning rate when the predicted availability is below an availability threshold value.

Alternatively, or in addition, in a further embodiment, the computer implemented method may comprise directing scanning for an 802.11 wireless network, a Bluetooth device, or a device enabled for WiFi Direct communications.

Alternatively, or in addition, in a further embodiment, the computer implemented method may comprise determining a change in activity state based upon the sensor data, identifying a set of parameters (P1, P2, ... $P_N$) associated with the change in activity state, and adjusting scanning rate R for wireless networks as a function $f$ of time T, according to $R=f(P1, P2, \ldots P_N, T-T_0)$, where $T_0$ represents the time since a last change in activity state.

In a further embodiment, an apparatus may be configured to perform the method of any one of the preceding embodiments.

In another embodiment, at least one machine readable medium may comprise a plurality of instructions that in response to being executed on a computing device, cause the computing device to carry out a method according to any one of the preceding embodiments.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a sensor;
   a processor circuit; and
   an adaptive scanning component for execution on the processor circuit to:
      receive sensor data from the sensor, the sensor data comprising accelerometer data;
      determine an activity state based upon the received sensor data;
      determine a frequency of a frequency component of the sensor data;
      compare the determined frequency to a frequency threshold for acceleration events;
      adjust a wireless network scanning procedure in accordance with the received sensor data; and
      adjust a scanning rate for wireless networks performed by the apparatus between a first instance and second instance when the frequency is greater than the frequency threshold between the first instance and second instance.

2. The apparatus of claim 1, the frequency threshold comprising a frequency of about 2 to 5 Hz.

3. The apparatus of claim 1, the adaptive scanning component for execution on the processor circuit to initiate rapid scanning for wireless networks when a change in activity state is determined.

4. The apparatus of claim 1, the adaptive scanning component for execution on the processor circuit to:
   receive sensor data during a first period;
   receive user input indicating activity state during the first period; and
   adjust one or more thresholds indicative of activity state based upon a comparison of the user input and sensor data received during the first period.

5. The apparatus of claim 1, the adaptive scanning component for execution on the processor circuit to:

store wireless network data and first sensor data received during a first period;
receive second sensor data during a second period;
predict availability of new wireless networks based upon the wireless network data, first sensor data, and second sensor data; and
reduce a network scanning rate when the predicted availability is below an availability threshold value.

6. The apparatus of claim 1, the adaptive scanning component for execution on the processor circuit to direct scanning for an IEEE 802.11 wireless network, a Bluetooth device, or a device enabled for peer to peer communications.

7. The apparatus of claim 1, the adaptive scanning component for execution on the processor circuit to:
determine a change in activity state based upon the sensor data;
identify a set of parameters ($P1, P2, \ldots P_N$) associated with the change in activity state; and
adjust scanning rate R for wireless networks as a function $f$ of time T, according to $R=f(P1, P2, \ldots P_N, T-T_0)$, where $T_0$ represents time since a last change in activity state.

8. The apparatus of claim 1, the sensor comprising part of a sensor set that
includes one or more accelerometers to generate accelerometer data associated with the apparatus;
one or more gyrometers to generate orientation data associated with the apparatus; or
an illumination sensor to detect illumination levels proximate the apparatus.

9. At least one non-transitory computer-readable storage medium comprising
instructions that, when executed, cause a system to:
scan received sensor data, the sensor data comprising accelerometer data;
determine activity state for the apparatus based upon the received sensor data;
determine a frequency of a frequency component of the sensor data;
compare the determined frequency component to a frequency threshold for acceleration events;
adjust a wireless network scanning procedure in accordance with the received sensor data; and
adjust a scanning rate for wireless networks performed by the apparatus between a first instance and second instance when the frequency of the frequency component is greater than the frequency threshold between the first instance and second instance.

10. The at least one non-transitory computer-readable storage medium of claim 9, the frequency threshold comprising a frequency of about 2 to 5 Hz.

11. The at least one non-transitory computer readable storage medium of claim 9, comprising instructions that, when executed, cause a system to:
estimate current activity state associated with the apparatus based upon the received sensor data; and
initiate rapid scanning for wireless networks when a change in activity state is determined.

12. The at least one non-transitory computer-readable storage medium of claim 9, comprising instructions that, when executed, cause a system to:
receive sensor data received during a first period;
receive user input indicating activity state during the first period; and
adjust one or more thresholds indicative of activity state based upon a comparison of the user input and sensor data received in the first period.

13. The at least one non-transitory computer-readable storage medium of claim 9, comprising instructions that, when executed, cause a system to:
store wireless network data and first sensor data received during a first period;
receive second sensor data received during a second period;
predict availability of new wireless networks based upon the wireless network data, first sensor data, and second sensor data; and
reduce a network scanning rate when the predicted availability is below an availability threshold value.

14. The at least one non-transitory computer-readable storage medium of claim 9, comprising instructions that, when executed, cause a system to direct scanning for an 802.11 wireless network, a Bluetooth device, or a device enabled for peer to peer communications.

15. The at least one non-transitory computer-readable storage medium of claim 9, comprising instructions that, when executed, cause a system to:
determine a change in activity state based upon the sensor data;
identify a set of parameters ($P1, P2, \ldots P_N$) associated with the change in activity state; and
adjust scanning rate R for wireless networks as a function $f$ of time T, according to $R=f(P1, P2, \ldots P_N, T-T_0)$, where $T_0$ represents time since a last change in activity state.

16. A computer implemented method, comprising:
receiving sensor data from one or more sensors coupled to an apparatus, the sensor data comprising accelerometer data;
determining activity state based upon the received sensor data;
determining a frequency of a frequency component of the accelerometer data;
comparing the determined frequency component to a frequency threshold for acceleration events;
adjusting a wireless network scanning procedure in accordance with the received sensor data; and
adjusting a scanning rate for wireless networks performed by the apparatus between a first instance and second instance when the frequency of the frequency component is greater than the frequency threshold between the first instance and second instance.

17. The computer implemented method of claim 16, the frequency threshold comprising a frequency of about 2 to 5 Hz.

18. The computer implemented method of claim 16, comprising:
estimating current activity state associated with the apparatus based upon the received sensor data; and
initiating rapid scanning for wireless networks when a change in activity state is determined.

19. The computer implemented method of claim 16, comprising:
receiving sensor data received during a first period;
receiving user input indicating activity state during the first period; and
adjusting one or more thresholds indicative of activity state based upon a comparison of the user input and sensor data received in the first period.

20. The computer implemented method of claim 16, comprising:
storing wireless network data and first sensor data received during a first period;

receiving second sensor data received during a second period;

predicting availability of new wireless networks based upon the wireless network data, first sensor data, and second sensor data; and reducing a network scanning rate when the predicted availability is below an availability threshold value.

21. The computer implemented method of claim 16, comprising directing scanning for an 802.11 wireless network, a Bluetooth device, or a device enabled for peer to peer communications.

22. The computer implemented method of claim 16, comprising:

determining a change in activity state based upon the sensor data;

identifying a set of parameters ($P1, P2, \ldots P_N$.) associated with the change in activity state; and adjusting scanning rate R for wireless networks as a function $f$ of time T, according to $R=f(P1, P2, \ldots P_N, T-T_0)$, where $T_0$ represents time since a last change in activity state.

\* \* \* \* \*

UNITED STATES PATENT AND TRADEMARK OFFICE
CERTIFICATE OF CORRECTION

| | | |
|---|---|---|
| PATENT NO. | : 8,983,442 B2 | Page 1 of 1 |
| APPLICATION NO. | : 13/715825 | |
| DATED | : March 17, 2015 | |
| INVENTOR(S) | : Adrian P. Stephens | |

It is certified that error appears in the above-identified patent and that said Letters Patent is hereby corrected as shown below:

In the Drawings:

On sheet 2 of 10, in Figure 3, reference numeral 214, line 1, delete "Acclerometer" and insert -- Accelerometer --, therefor.

In the Claims:

In column 17, line 52, in claim 11, delete "computer readable" and insert -- computer-readable --, therefor.

Signed and Sealed this
Fourth Day of August, 2015

Michelle K. Lee
*Director of the United States Patent and Trademark Office*